3,316,320
HYDROCARBON DEHYDROGENATION IN THE PRESENCE OF CHLORINE AND OXYGEN

Laimonis Bajars, Princeton, N.J., assignor to Petro-Tex Chemical Corporation, Houston, Tex., a corporation of Delaware
No Drawing. Filed June 11, 1965, Ser. No. 463,377
13 Claims. (Cl. 260—680)

This application is a continuation-in-part of my earlier filed copending application Serial Number 244,276, filed December 13, 1962, entitled "Dehydrogenation Process," now U.S. Patent No. 3,207,811, which in turn was a continuation-in-part of my earlier filed application Serial Number 36,718, filed June 17, 1960, entitled "Dehydrogenation Process," now abandoned.

This invention relates to a process for dehydrogenating organic compounds.

The invention is suitably carried out by passing a mixture in critical proportions, of the compound to be dehydrogenated, chlorine or a chlorine-liberating compound, and oxygen, at a temperature of at least 450° C., and at an organic compound partial pressure equivalent to less than about one-fifth atmosphere at a total pressure of one atmosphere in the presence of hereinafter defined catalysts of the Periodic Table Groups IIIB, to obtain the corresponding unsaturated organic compound derivative of the same number of carbon atoms.

Suitable hydrocarbons to be dehydrogenated according to the process of this invention are aliphatic hydrocarbons of 4 to 6 carbon atoms and preferably are selected from the group consisting of mono-olefins or diolefins of 4 to 6 carbon atoms, saturated aliphatic hydrocarbons of 4 to 6 carbon atoms and mixtures thereof. Examples of feed materials are butene-1, bis-butene-2, trans-butene-2, 2-methyl butene-3, 2-methyl butene-1, 2-methyl butene-2, n-butane, isobutane, butadiene-1,3, methyl butane, 2-methyl pentene-1, 2-methyl pentene-2 and mixtures thereof. For example, n-butane may be converted to a mixture of butene-1 and butene-2 or may be converted to a mixture of butene-1, butene-2 and/or butadiene-1,3. A mixture of n-butane and butene-2 may be converted to butadiene-1,3 or a mixture of butadiene-1,3 together with some butene-2 and butene-1. n-Butane, butene-1, butene-2 or butadiene-1,3 or mixtures thereof may be converted to vinyl acetylene. The reaction temperature for the production of vinyl acetylene is normally within the range of about 600° C. to 1000° C., such as between 650° C. and 850° C. Isobutane may be converted to isobutylene. The 2-methyl butenes such as 2-methyl butene-1 may be converted to isoprene. Excellent starting materials are the four carbon hydrocarbons such as butene-1, cis or trans butene-2, n-butane, and butadiene-1,3 and mixtures thereof. Useful feeds as starting materials may be mixed hydrocarbon streams such as refinery streams. For example, the feed material may be the olefin-containing hydrocarbon mixture obtained as the product from the dehydrogenation of hydrocarbons. Another source of feed for the present process is from refinery by-products. For example, in the production of gasoline from higher hydrocarbons by either thermal or catalytic cracking a predominantly hydrocarbon stream containing predominantly hydrocarbons of four carbon atoms may be produced and may comprise a mixture of butenes together with butadiene, butane, isobutane, isobutylene and other ingredients in minor amounts. These and other refinery by-products which contain normal ethylenically unsaturated hydrocarbons are useful as starting materials. Another source of feedstock is the product from the dehydrogenation of butane to butenes employing the Houdry Process. Although various mixtures of hydrocarbons are useful, the preferred hydrocarbon feed contains at least 50 weight percent butene-1, butene-2, n-butane and/or butadiene-1,3 and mixtures thereof, and more preferably contains at least 70 percent n-butane, butene-1, butene-2 and/or butadiene-1,3 and mixtures thereof. Any remainder usually will be aliphatic hydrocarbons. The process of this invention is particularly effective in dehydrogenating aliphatic hydrocarbons having a straight carbon chain of at least 4 carbon atoms to provide a product wherein the major unsaturated product has the same number of carbon atoms as the feed hydrocarbon.

The chlorine-liberating material may be such as chlorine itself, hydrogen chloride, alkyl chlorides of 1 to 4 carbon atoms such as methyl chloride or ethylene dichloride, carbon tetrachloride, ammonium chloride, volatile metalloid chlorides, aromatic chlorides such as phenyl chloride, heterocyclic chloride, such as cyclohexyl chloride, and the like. Preferably the chlorine-containing material will either volatilize or decompose at a temperature of no greater than 100° C. to liberate the required amount of chlorine or hydrogen chloride. The amount of chlorine must be at least 0.001 or 0.005 mol, and usually an amount of at least 0.01 mol of chlorine per mol or organic compound to be dehydrogenated will be used. It is one of the unexpected advantages of this invention that only very small amounts of chlorine are required. Less than 0.5 mol of chlorine, as 0.2 mol, per mol of organic compound to be dehydrogenated may be employed. Suitable ranges are such as from about .005 or 0.01 to 0.05, 0.1 or 0.25 mol of chlorine per mol of the compound to be dehydrogenated. Excellent results are obtained when the chlorine is present in an amount of less than 0.3 mol of chlorine per mol of the compound to be dehydrogenated. It is understood that when a quantity of chlorine is referred to herein, both in the specification and the claims, that this refers to the calculated quantity of chlorine in all forms present in the vapor space under the conditions of reaction regardless of the initial source or the form in which the chlorine is present. For example, a reference to 0.05 mol of chlorine would refer to the quantity of chlorine present whether the chlorine was fed as 0.05 mol of $Cl_2$ or 0.10 mol of HCl. Preferably, the chlorine will be present in an amount no greater than 5 or 10 mol percent of the total feed to the dehydrogenation zone, including any diluents.

The minimum amount of oxygen employed will generally be at least about one-fourth mol of oxygen per mol of organic compound to be dehydrogenated. Large amounts as about 3 mols of oxygen per mol of organic compound may be used. Excellent yields of the desired unsaturated derivatives have been obtained with amounts of oxygen from about 0.4 to about 1.0 or 1.5 mols of oxygen per mol of organic compound and suitably may be within the range of about 0.4 to 2 mols of oxygen per mol of organic compound. Preferably, the oxygen will be present in an amount of at least 0.6 mol per mol of compound to be dehydrogenated. Oxygen may be supplied to the reaction system as oxygen diluted with inert gases such as helium, carbon dioxide, as air and the like. In relation to chlorine, the amount of oxygen employed should be greater than 1.50 grams mols of oxygen per gram atoms of chlorine present in the reaction mixture. Usualy the ratio of the mols of oxygen to the mols of chlorine will be greater than 4 or 5 mols of oxygen per mol of chlorine, such as between 6 or 8 and 500 or about 15 and 300 mols of oxygen per mol of chlorine.

The total pressure on systems employing the process of this invention normally will be at or in excess of atmospheric pressure but vacuum may be used. Higher pressures, such as about 100 or 200 p.s.i.g. may be used. The initial partial pressure of the organic compound to be dehydrogenated under reaction conditions is critical and preferably equivalent to below about one-fifth atmosphere (or about 6 inches of mercury absolute) when the total pressure is atmospheric to realize the advantages of this invention and more preferably equivalent to no greater than 3 or 4 inches of mercury absolute. Also, because the initial partial pressure of the hydrocarbon to be dehydrogenated is equivalent to less than about 6 inches of mercury at a total pressure of one atmosphere, the combined partial pressure of the hydrocarbon to be dehydrogenated plus the dehydrogenated hydrocarbon will also be equivalent to less than about 6 inches of mercury. For example, if butene is being dehydrogenated to butadiene, at no time will the combined partial pressure of the butene and butadiene be greater than equivalent to about 6 inches of mercury at a total pressure of one atmosphere. The desired pressure is obtained and maintained by techniques including vacuum operations, or by using helium, organic compounds, nitrogen, steam and the like, or by a combination of these methods. Steam is particularly advantageous and it is surprising that the desired reactions to produce high yields of product are effected in the presence of large amounts of steam. When steam is employed, the ratio of steam to hydrocarbon to be dehydrogenated is normally within the range of about 4 or 5 to 20 or 30 mols of steam per mol of hydrocarbon, and generally will be between 8 and 15 mols of steam per mol of hydrocarbon. The degree of dilution of the reactants with steam, nitrogen and the like is related to keeping the partial pressure of hydrocarbon to be dehydrogenated in the system equivalent to preferably below 6 inches of mercury at one atmosphere total pressure. For example, in a mixture of one mol of butene, three mols of steam and one mol of oxygen under a total pressure of one atmosphere, the butene would have an absolute pressure of one-fifth of the total pressure, or roughly six inches of mercury absolute pressure. Equivalent to this six inches of mercury butene absolute pressure at atmospheric pressure would be butene mixed with oxygen and chlorine under a vacuum such that the partial pressure of the butene is six inches of mercury absolute. A combination of a diluent such as steam together with a vacuum may be utilized to achieve the desired partial pressure of the hydrocarbon. For the purpose of this invention, also equivalent to the six inches of mercury butene absolute pressure at atmospheric pressure would be the same mixture of one mol of butene, three mols of steam and one mol of oxygen under a total pressure greater than atmospheric, for example, a total pressure of 15 or 20 inches mercury above atmospheric. Thus, when the total pressure on the reaction zone is greater than one atmosphere, the absolute values for the pressure of butene will be increased in direct proportion to the increase in total pressure above one atmosphere. Another feature of this invention is that the combined partial pressure of the hydrocarbon to be dehydrogenated plus the chlorine-liberating material will also be equivalent to less than 6 inches of mercury, and preferably no greater than 3 or 4 inches of mercury, at a total pressure of one atmosphere. The lower limit of hydrocarbon partial pressure will be dictated by commercial considerations and practically will be greater than about 0.1 inch mercury.

The temperature of reaction must be at least 450° C. and preferably will be at least about 500° C. The temperature of the reaction is from about 450° C. to temperatures as high as 850° C. or 1000° C. The optimum temperature is normally determined as by thermocouple at the maximum temperature of the reaction. Usually the temperature of reaction will be from at least or greater than 450° C. to about 750° C. or 900° C. Excellent results have been obtained in the range of about 550° C. to 750° C., or 500° C. to 850° C. At the higher temperatures vinyl acetylene may be produced from 4 carbon hydrocarbon feed such as butene or butadiene. The temperatures are measured at the maximum temperature in the rector.

The flow rates of the gaseous reactants may be varied quite widely and organic compound gaseous flow rates ranging from about 0.1 to about 5 liquid volumes of organic compound per volume of reactor packing per hour have been used. Generally, the flow rates will be within the range of about 0.10 to 25 or higher liquid volumes of the compound to be dehydrogenated, calculated at standard conditions of 0° C. and 760 mm. of mercury per volume of reactor space containing catalyst per hour (referred to as either LHSV or liquid v./v./hr.). Usually the LHSV will be between 0.15 and 15. The volume of reactor containing catalyst is that volume of reactor space including the volume displaced by the catalyst. For example, if a reactor has a particular volume of cubic feet of void space, when that void space is filled with catalyst particles, the original void space is the volume of reactor containing catalyst for the purpose of calculating the flow rates. The residence or contact time of the reactants in the reaction zone under any given set of reaction conditions depends upon the factors involved in the reaction. Contact times ranging from about 0.001 or 0.01 to about one second or higher, such as 5 or 10 or 20 seconds, have been found to be satisfactory. A preferred range is from 0.001 to 5 seconds. Residence time is the calculated dwell time of the reaction mixture in the reaction zone, assuming the mols of production mixture are equivalent to the mols of feed mixture. For the purpose of calculation of residence times, the reaction zone is the portion of the reactor containing catalyst.

The manner of mixing the chlorine or chlorine-liberating compound, organic compound to be dehydrogenated, oxygen containing gas, and steam, if employed, is subject to some choice. In normal operations, the organic compound may be preheated and mixed with steam and preheated oxygen or air, and chlorine or hydrogen chloride are mixed therewith prior to passing the stream in vapor phase over the catalyst bed. Hydrogen chloride or a source of chlorine may be dissolved in water and may be mixed with steam or air prior to reaction. Any of the reactants may be split and added incrementally. For example, part of the chlorine material may be mixed with the hydrocarbon to be dehydrogenated and the oxygen. The mixture may then be heated to effect some dehydrogenation and thereafter the remainder of the chlorine material added to effect further dehydrogenation. The hydrocarbon product is then suitably purified as by fractionation to obtain the desired high purity unsaturated product.

For conducting the reaction, a variety of reactor types may be employed. Fixed bed reactors may be used and fluid and moving bed systems are advantageously applied to the process of this invention. In any of the reactors suitable means for heat removal may be provided. Tubular reactors of small diameter may be employed and large diameter reactors which are loaded or packed with packing maaterials are very satisfactory.

Excellent results have been obtained by packing the reactor with the defined catalyst particles as the method of introducing the catalytic surface. The size of the catalyst particles may vary widely but generally the maximum particle size will at least pass through a Tyler standard screen which has an opening of 2 inches, and generally the largest particles of catalyst will pass through a Tyler screen with one inch openings. Very small particle size carriers may be utilized with the only practical objection being that extremely small particles cause excessive pressure drops across the reactor. In order to avoid high pressure drops across the reactor, generally at least 50 percent by weight of the catalyst will be retained by a 10 mesh Tyler standard screen which has openings of $\frac{1}{16}$ inch. However, if a fluid bed reactor is utilized, catalyst particles may be quite small, such as from about 10 to 300 microns. Thus, the particle size when particles are used preferably will be from about 10 microns to a particle size which will pass through a Tyler screen with openings of 2 inches. If a carrier is used, the catalyst may be deposited on the carrier by methods known in the art such as by preparing an aqueous solution or dispersion of the described catalyst, mixing the carrier with the solution or dispersion until the active ingredients are coated on the carrier. The coated particles may then be dried, for example, in an oven at about 110° C. Various other methods of catalyst preparation known to those skilled in the art may be used. When carriers are utilized, these will be approximately of the same size as the final coated catalyst particle, that is, for fixed bed processes the carriers will generally be retained on 10 mesh Tyler screen and will pass through a Tyler screen with openings of 2 inches. Very useful carriers are Alundum, silicon carbide, Carborundum, pumice, kieselguhr, asbestos, and the like. Th Alundums or other alumina carriers are particularly useful. When carriers are used, the amount of catalyst on the carrier will generally be in the range of about 5 to 75 weight percent of the total weight of the active catalytic material plus carrier. The carriers may be of a variety of shapes, including irregular shapes, cylinders or spheres. Another method for introducing the required surface is to utilize as a reactor a small diameter tube wherein the tube wall is catalytic or is coated with catalytic material. If the tube wall is the only source of catalyst generally the tube wall will be of an internal diameter of no greater than one inch such as less than 3/4 inch in diameter or preferably will be no greater than about 1/2 inch in diameter. Other methods may be utilized to introduce the catalytic surface such as by the use of rods, wires, mesh or shreds and the like of catalytic material. The technique of utilizing fluid beds lends itself well to the process of this invention.

In the descriptions below of catalyst compositions, the composition described is that of the surface which is exposed in the dehydrogenation zone to the reactants. That is, if a catalyst carrier is used, the composition described as the catalyst refers to the composition of the surface and not to the total composition of the surface coating plus carrier. The catalytic compositions are intimate combinations or mixtures of the ingredients. These ingredients may or may not be chemically combined or alloyed. Inert catalyst binding agents or fillers may be used, but these will not ordinarily exceed about 50 percent or 65 percent by weight of the catalytic surface exposed to the reaction gases.

The amount of solid catalyst utilized may be varied depending upon such variables as the activity of the catalyst, the amount of chlorine and oxygen used, the flow rates of reactants and the temperature of reaction. The amount of catalyst will be present in an amount of greater than 25 square feet of catalyst surface per cubic foot of reaction zone containing catalyst. Generally the ratios will be at least 40 square feet of catalyst surface per cubic foot of reaction zone. The catalyst is more effectively utilized when the catalyst is present in an amount of at least 75 square feet of catalyst surface per cubic foot of reaction zone containing catalyst, and preferably the ratio of catalyst surface to volume will be at least 120 square feet of catalyst surface per cubic foot of reaction zone containing catalyst. Of course, the amount of catalyst surface may be much greater when irregular surface catalysts are used. When the catalyst is in the form of particles, either supported or unsupported, the amount of catalyst surface may be expressed in terms of the surface area per unit weight of any particular volume of catalyst particles. The ratio of catalytic surface to weight will be dependent upon various factors including the particle size, particle distribution, apparent bulk density of the particles, amount of active catalyst coated on the carrier, density of the carrier, and so forth. Typical values for the surface to weight ratio are such as about 1/2 to 200 square meters per gram,[1] although higher and lower values may be used.

The catalyst of this invention will be a metal or metal compound of the Periodic Table Group IIIB and mixtures thereof. The groups are based on the conventional long form of the Periodic Table as found on pages 400 and 401 of the 39th edition (1957–58) of the Handbook of Chemistry and Physics (Chemical Rubber Publishing Company). The metals of the Group IIIB and compounds thereof such as the salts, oxides, or hydroxides are effective catalysts. Particularly effective are inorganic compounds such as the oxides, phosphates, and the halides, such as the iodides, bromides, chlorides and fluorides. Useful catalysts are such as scandium bromide, lanthanum oxide, lanthanum chloride, ceric oxide, cerous chloride, cerous fluoride, cerium hydroxide, thoria, thorium chloride, uranium dioxide, mixtures of rare earth compounds and the like. Compounds of the lanthanum series such as cerium oxide, praseodymium oxide, neodymium oxide, samarium oxide, and the like, and mixtures thereof are useful. Similarly, compounds of the actinium series such as thorium oxide, uranium oxide, and oxides of the remaining members of the series and mixtures thereof are useful. The halides of the langthanum series and actinium series elements are entirely suitable. Mixtures of the metal or metal compounds may be used, such as a mixture of two or more compounds. Also, mixtures of salts, such as halides, and oxides may be employed. Preferably the catalyst will be solid under the conditions of reaction. Excellent catalysts are those comprising atoms of cerium, thorium and uranium, such as the oxides, phosphates, iodides, bromides, chlorides or fluorides and mixtures thereof of these elements. Many of the salts, oxides and hydroxides of the metals of the listed Group IIIB may change during the preparation of the catalyst, during heating in a reactor prior to use in the process of this invention, or are converted to another form under the described reaction conditions, but such materials still function as an effective compound in the defined process. For example, many of the metal nitrates, nitrites, carbonates, hydroxides, acetates, and the like, are readily converted to the corresponding oxide or chloride under the reaction conditions defined herein. Such salts as the phosphates, sulfates, halides, and the like, of the defined metal group, which are stable or partially stable at the defined reaction temperatures are likewise effective under the conditions of the described reaction, as well as such compounds which are converted to another form in the reactor. Other suitable compounds are such as the sulfites, silicates, and sulfides. At any rate, the catalysts are effective if the Group IIIB elements are present in a catalytic amount in contact with the reaction gases. The metal oxides represent a useful class of materials, since they are inexpensive and are readily formed into pellets or deposited on carriers, and may be readily formed in situ from various salts and hydroxides. The catalysts of this invention are solid at room temperature or are essentially solid under the conditions of reaction (although some volatilization may occur).

In the following examples will be found specific embodiments of the invention and details employed in the practice of the invention. LHSV (or liquid v./v./hr.) means, with reference to the flow rate of organic compound to be dehydrogenated, liquid volume of organic compound per hour per volume of packing or active surface material in the reaction zone. Percent conversion represents mols of organic compound consumed per 100 mols of organic compound fed to a reactor and percent selectivity represents the mols of defined unsaturated organic derivative thereof formed per 100 mols of organic compound consumed. These examples are intended as

---

[1] As measured by the Innes nitrogen absorption method on a representative unit volume of catalyst particles. The Innes method is reported in Innes, W. B., Anal. Chem. 23, 759 (1951).

lustrative only since numerous modifications and variations in accordance with the disclosure herein will be apparent to those skilled in the art. All quantities of chlorine expressed are calculated as mols of $Cl_2$.

EXAMPLE 1

A Vycor[1] reactor, which is filled with ¼ inch Vycor Raschig rings having deposited thereon the hereinafter designated metal compounds, is heated by means of an external electric furnace. The rings are coated with the metal oxides from water slurries thereof and dried before use in a stream of air. At a 700° C. furnace temperature, in a series of runs, butene-2 is used at a flow rate of one liquid v./v./hr., mixed with oxygen and steam at mol ratios of butene to steam to oxygen of 1 to 16 to 0.85. Hydrogen chloride is added as a 37 percent aqueous solution at a rate which is equivalent to 0.115 mol of chlorine ($Cl_2$) per mol of butene-2. Butene and oxygen are added to the top of the reactor, hydrogen chloride is added to this stream thereafter as its enters the reactor, and steam is added separately opposite this stream. When using a lanthanum oxide catalyst, 64 mol percent of the butene is converted.

Chlorine is suitably used to replace HCl in this example. When the above example is repeated using the same reaction conditions and ceric oxide on a support as alundum, isobutylene is obtained from isobutane and isoprene is obtained from 2-methyl butene-2.

EXAMPLE 2

The runs are made in a Vycor reactor which is one inch internal diameter; the overall length of the reactor is about 36 inches with the middle 24 inches of the reactor being encompassed by a heating furnace; the bottom 6 inches of the reactor is empty; at the top of this 6 inches is a retaining plate, and on top of this plate are placed 6 inches of the catalyst particles; the remainder of the reactor is filled with 6 mm. x 6 mm. inert Vycor Raschig rings; the actives of the catalyst were coated on 6 mm. x 6 mm. inert Vycor Raschig rings by depositing a water slurry of the active material on the rings followed by drying overnight at about 110° C., and the flow rates are calculated on the valume of the 6 inch long by 1 inch diameter portion of the reactor which is filled with catalyst particles. The Vycor reactor is packed with Vycor Raschig rings having deposited thereon Lindsay Code 217 cerium oxide (99.9 percent $CeO_2$). At a 650° C. maximum bed temperature, butene-2 is deyhdrogenated to butadiene-1,3. The flow rate of butene-2 is maintained at ½ liquid volume of butene-2 (calculated at 0° C. and 760 mm. mercury) per volume of reactor packed with catalyst per hour (lv./v./hr.). Oxygen and steam are also fed to the reactor in the same stream at a mol ratio of oxygen to butene-2 of 0.85, and a mol ratio of steam to butene-2 of 15. Hydrogen chloride is added to the inlet to the reactor as an aqueous solution at a rate which is equivalent to 0.115 mol of chlorine (calculated as $Cl_2$) per mole of butene-2. The butene-2 and oxygen are added to the top of the reactor and the aqueous solution of hydrogen chloride is added to this stream as it enters the reactor. The steam is added separately in a line which is opposite the hydrogen chloride inlet line. The conversion of butene-2 is 63 mol percent, with 47 mol percent selectivity to butadiene. The resulting yield is 30 mol percent butadiene-1,3 based on the amount of butene-2 fed to the reactor. The catalyst is not coated with carbon.

EXAMPLE 3

Butene-2 is dehydrogenated employing a mixed catalyst containing both elements from the lanthanum series and the actinium series. The catalyst used is Lindsay 210-B with cerium oxide as the major ingredient, together with minor amounts of mixed rare earths and thorium oxide. The flow rate is ½ LHSV and steam, oxygen and HCl are fed in molar ratios of 15, .85 and .115 (calculated as $Cl_2$) respectively. At a reactor temperature of 650° C. the yield of butadiene-1,3 is 55 mol percent per pass.

EXAMPLE 4

Example 3 is repeated with the exception that the catalyst is a didymium hydrate having as its major ingredients lanthanum oxide (approximately 35.5 calculated percent by weight oxide) and neodymium (approximately 25.4 percent by weight oxide) together with $CeO_2$ (1.2 percent), $Pr_6O_{11}$ (7.4 percent), $Sm_2O_3$ (4.3 percent), $Gd_2O_3$ (2.7 percent), $Y_2O_3$ (.3 percent), other rare earth oxides (1.2 percent), with the loss on ignition being approximately 20 percent by weight. At a reactor temperature of 700° C., the yield of butadiene is 44 mol percent.

EXAMPLE 5

Example 4 is repeated using a didymium oxide (approximately 42.8 percent lanthanum calculated as $La_2O_3$) instead of the hydrate. Roughly equivalent results are obtained.

EXAMPLE 6

Example 2 is repeated with the exception that the butene is replaced with 2-methyl butene-2, the chlorine is used in an amount of 0.06 mol, and the reactor temperature is 725° C. to produce isoprene.

EXAMPLE 7

Example 1 is repeated substituting a 50—50 molar mixture of n-butene-2 and n-butane for the butene of Example 2 and using a Lindsay rare earth chloride as the catalyst. Both n-butene and butadiene are produced by the run at 675° C.

EXAMPLE 8 n-Butene-1 is dehydrogenated to butadiene-1,3 using an analytical grade $ThO_2$ (99.9 percent) as the catalyst. The molar ratio of reactants is .005 $Cl_2$, 1.2 oxygen as air, 10 helium per mol of n-butene-1. At a flow rate of 0.3 LHSV and at a temperature of 675° C., butadiene-1,3 is produced at a high selectivity.

From the foregoing description of the invention, it will be seen that a novel and greatly improved process is provided for producing unsaturated compounds of lower molecular weight but of the same number of carbon atoms as the feed. Other examples could be devised for a process whereby the catalyst contained the described elements, preferably with the described elements constituting greater than or at least fifty atomic weight percent of any cations in the surface exposed to the reaction gases. Excellent catalysts are obtained when the defined catalytic materials are the main active constituent in the catalyst. Also, the catalysts may consist essentially of the defined catalytic materials. Although representative embodiments of the invention have been specifically described, it is not intended or desired that the invention be limited solely thereto since it will be apparent to those skilled in the art that modifications and variations may be made without departing from the spirit and scope of the invention. The products such as butadiene-1,3 have many well known uses such as raw materials for the production of synthetic rubber.

I claim:
1. The method for dehydrogenating aliphatic hydrocarbons of 4 to 6 carbon atoms which comprises heating in the vapor phase at a temperature of from about 450° C. to 850° C. an aliphatic hydrocarbon of 4 to 6 carbon atoms with oxygen in a molar ratio of at least one-fourth mol of oxygen per mol of said hydrocarbon and chlorine in a molar ratio of from 0.001 mol to 0.5 mol of chlorine per mol of said aliphatic hydrocarbon, the partial pressure of said aliphatic hydrocarbon being equivalent to less than about one-fifth atmosphere at a

---

[1] Vycor is the trade name of Corning Glass Works, Corning, N.Y., and is composed of approximately 96 percent silica with the remainder being essentially $B_2O_3$.

total pressure of one atmosphere, with a material selected from the group consisting of metals, salts, oxides and hydroxides of metal elements of Periodic Table Group IIIB and mixtures thereof in a catalytic amount, the ratio of the gram mols of the said oxygen to the gram atoms of said chlorine being at least 1.50.

2. The method of claim 1 wherein the said Group IIIB material comprises cerium oxide as its main active constituent.

3. The method of claim 1 wherein the said Group IIIB material comprises lanthanum oxide as its main active constituent.

4. The method of claim 1 wherein the said hydrocarbon is butene.

5. The method of claim 1 wherein the oxygen is present in an amount of from about 0.4 to 2 mols of oxygen per mol of said hydrocarbon.

6. The method of claim 1 wherein the chlorine is present in an amount of from at least 0.01 mol of chlorine to 0.2 mol of chlorine per mol of said hydrocarbon.

7. The method of claim 1 wherein the said material has as its main active constituent the said metals, salts, oxides and hydroxides of metal elements of Group IIIB and mixtures thereof.

8. The method of claim 1 wherein the Group IIIB element is present as a chloride.

9. The method of claim 1 wherein the Group IIIB element is present as an inorganic salt.

10. The method for dehydrogenating aliphatic hydrocarbons of 4 to 6 carbon atoms which comprises heating in the vapor phase at a temperature of from about 450° C. to 850° C. the corresponding aliphatic hydrocarbon of 4 to 6 carbon atoms with oxygen in a molar ratio of from about 0.4 to 2 mols of oxygen per mol of said aliphatic hydrocarbon and chlorine in a molar ratio of from at least 0.01 mol of chlorine to 0.2 mol of chlorine per mol of said hydrocarbon, the partial pressure of said hydrocarbon being equivalent to less than about one-fifth atmosphere at a total pressure of one atmosphere, in the presence of a catalyst having rare earth elements in an amount greater than fifty atomic weight percent of any cations in the catalyst surface exposed to the reaction gases, the ratio of the gram mols of the said oxygen to the gram atoms of said chlorine being at least 1.50.

11. The method for dehydrogenating aliphatic hydrocarbons of 4 to 6 carbon atoms which comprises heating in the vapor phase at a temperature of from about 450° C. to 850° C. the corresponding aliphatic hydrocarbon of 4 to 6 carbon atoms with oxygen in a molar ratio of from about 0.4 to 2 mols of oxygen per mol of said aliphatic hydrocarbon and chlorine in a molar ratio of from at least 0.01 mol of chlorine to 0.2 mol of chlorine per mol of said hydrocarbon, the partial pressure of said hydrocarbon being equivalent to less than about one-fifth atmosphere at a total pressure of one atmosphere, in the presence of a catalyst having cerium in an amount greater than fifty atomic weight percent of any cations in the catalyst surface exposed to the reaction gases, the ratio of the gram mols of the said oxygen to the gram atoms of said chlorine being at least 1.50.

12. The method for dehydrogenating aliphatic hydrocarbons of 4 to 6 carbon atoms which comprises heating in the vapor phase at a temperature of from about 450° C. to 850° C. an aliphatic hydrocarbon of 4 to 6 carbon atoms with oxygen in a molar ratio of at least one-fourth the mol of oxygen per mol of said hydrocarbon and chlorine in a molar ratio of from 0.001 to 0.5 mol of chlorine per mol of said aliphatic hydrocarbon, the partial pressure of said aliphatic hydrocarbon being equivalent to less than about one-fifth atmosphere at a total pressure of one atmosphere, with a material selected from the group consisting of oxides of metal elements of Periodic Table Group IIIB and mixtures thereof in a catalytic amount, the ratio of the gram mols of the said oxygen to the gram atoms of said chlorine being at least 1.50.

13. The method of dehydrogenation of n-butene-2 which comprises heating in the vapor phase at a temperature of about 550° C. to 750° C. butene-2 with oxygen in an amount of about 0.85 mol of oxygen per mol of butene-2 and about 0.115 mol of chlorine per mol of butene-2 and about 16 mols of steam per mol of butene-2 with a cerium oxide catalyst.

References Cited by the Examiner

UNITED STATES PATENTS

| | | | |
|---|---|---|---|
| 3,028,440 | 4/1962 | Arganbright | 260—680 |
| 3,108,143 | 10/1963 | Tallman | 260—666 |
| 3,108,144 | 10/1963 | Tallman | 260—666 |
| 3,116,338 | 12/1963 | Guest et al. | 260—666 |
| 3,205,280 | 9/1965 | Wattimena et al. | 260—680 |

FOREIGN PATENTS 840,519  1/1939  France.

PAUL M. COUGHLAN, Jr., *Primary Examiner.*